United States Patent
Sommer (10) Patent No.: US 6,433,924 B1
(45) Date of Patent: Aug. 13, 2002

(54) WAVELENGTH-SELECTIVE OPTICAL AMPLIFIER

(75) Inventor: Thomas R. Sommer, Sebastopol, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/712,999

(22) Filed: Nov. 14, 2000

(51) Int. Cl.[7] .......................... H04B 10/12; G02B 6/38; G02B 6/36; H01S 3/00

(52) U.S. Cl. ................ 359/337.1; 359/349; 359/341.1; 359/333; 385/60; 385/72; 385/78

(58) Field of Search .................. 385/60, 61, 64, 385/72, 78, 79, 82, 84; 359/333, 337.1, 337.2, 341.32, 349, 341.1

(56) References Cited

U.S. PATENT DOCUMENTS

| | | | |
|---|---|---|---|
| 4,188,087 A | * 2/1980 | D'Auria | 350/96.2 |
| 4,637,683 A | * 1/1987 | Asawa | 350/96.18 |
| 4,730,891 A | * 3/1988 | Poorman | 350/96.21 |
| 4,995,696 A | * 2/1991 | Nishimura | 350/96.2 |
| 5,050,954 A | * 9/1991 | Gardner | 385/16 |
| 5,082,343 A | 1/1992 | Coult et al. | 385/34 |
| 5,260,823 A | 11/1993 | Payne et al. | 359/341 |
| 5,323,474 A | * 6/1994 | Hornung | 385/24 |
| 5,375,010 A | 12/1994 | Zervas et al. | 359/341 |
| 5,422,968 A | 6/1995 | Hanatani et al. | 385/24 |
| 5,452,116 A | 9/1995 | Kirkby et al. | 359/124 |
| 5,506,723 A | 4/1996 | Juniger | 359/341 |
| 5,555,330 A | * 9/1996 | Pan | 385/39 |
| 5,559,916 A | * 9/1996 | Terao | 385/85 |
| 5,594,821 A | 1/1997 | Cheng | 385/24 |
| 5,608,571 A | 3/1997 | Epworth et al. | 359/341 |
| 5,675,683 A | 10/1997 | Takahashi et al. | 385/78 |
| 5,676,432 A | 10/1997 | Kosaka | 359/341 |
| 5,682,452 A | 10/1997 | Takahashi | 385/85 |
| 5,692,081 A | * 11/1997 | Takahashi | 385/78 |
| 5,710,660 A | 1/1998 | Yamamoto et al. | 359/341 |
| 5,790,314 A | 8/1998 | Duck et al. | 359/654 |
| 5,796,889 A | 8/1998 | Xu et al. | 385/24 |
| 5,801,858 A | 9/1998 | Roberts et al. | 359/114 |
| 5,808,788 A | * 9/1998 | Park | 359/341 |
| 5,812,307 A | * 9/1998 | Naganuma | 359/341 |
| 5,831,754 A | 11/1998 | Nakano | 359/161 |
| 5,835,259 A | 11/1998 | Kakui et al. | 359/341 |
| 5,838,847 A | 11/1998 | Pan et al. | 385/18 |
| 5,841,573 A | * 11/1998 | Kim | 359/341 |
| 5,880,875 A | * 3/1999 | Kim | 359/341 |
| 5,881,189 A | * 3/1999 | Carberry | 385/39 |
| 5,900,969 A | 5/1999 | Srivastava et al. | 359/341 |
| 5,900,970 A | 5/1999 | Kakui | 359/341 |
| 5,914,808 A | 6/1999 | Mitsuda et al. | 359/341 |
| 5,956,441 A | 9/1999 | Fairchild et al. | 385/27 |

(List continued on next page.)

FOREIGN PATENT DOCUMENTS

| | | | |
|---|---|---|---|
| GB | 2 138 161 | * 10/1984 | G02B/7/26 |
| WO | WO 99/13607 | 3/1999 | H04J/14/02 |
| WO | WO 99/50938 | 10/1999 | H01S/3/00 |
| WO | WO 99/66660 | 12/1999 | H04B/10/18 |

OTHER PUBLICATIONS

Becker et al., Erbium–Doped Fiber Amplifers, p. 66, 273–74, 276, 294–95, 1999, San Diego.

*Primary Examiner*—Thomas H. Tarcza
*Assistant Examiner*—Andrew R. Sommer (57) ABSTRACT

A wavelength-selective filter, such as a narrow bandpass filter, is used to filter both the input and output of an optical amplifier. The selected channel is amplified and can be re-combined with the other original channels or provided to another output, depending on amplifier configuration. In a particular embodiment, a two-stage amplifier with center stage access uses a single gain-flattening filter to compensate for gain tilt of both amplifier stages.

47 Claims, 7 Drawing Sheets

U.S. PATENT DOCUMENTS

| | | | |
|---|---|---|---|
| 6,055,347 A | 4/2000 | Li et al. | 385/34 |
| 6,118,912 A * | 9/2000 | Xu | 385/24 |
| 6,122,110 A * | 9/2000 | Park | 359/641 |
| 6,122,420 A * | 9/2000 | Satoh | 385/33 |
| 6,168,319 B1 * | 1/2001 | Francis | 385/79 |
| 6,173,095 B1 * | 1/2001 | Sakano | 385/38 |
| 6,198,858 B1 * | 3/2001 | Pan | 385/24 |
| 6,215,582 B1 * | 4/2001 | Sudo | 359/341 |
| 6,282,339 B1 * | 8/2001 | Zheng | 385/34 |
| 6,295,393 B1 * | 9/2001 | Naganuma | 385/11 |
| 6,310,717 B1 * | 10/2001 | Naganuma | 359/341.1 |

\* cited by examiner

WAVELENGTH-SELECTIVE OPTICAL AMPLIFIER

CROSS REFERENCE TO RELATED APPLICATIONS

Not Applicable.

STATEMENT AS TO THE RIGHTS TO INVENTION MADE UNDER FEDERALLY SPONSORED RESEARCH AND DEVELOPMENT

Not Applicable.

FIELD OF THE INVENTION

This invention relates to doped-fiber optical amplifiers, and more specifically to doped-fiber optical amplifiers with wavelength-selective optical filters, such as wavelength-division multiplexing ("WDM") filters and gain flattening filters ("GFF's").

BACKGROUND

The use of optical networks for data, voice, image and other sorts of transmission is rapidly growing. Optical fiber networks use optical fibers as transmission lines for carrying light signals. The light signals propagate down the fiber from one location to another, analogous to electrical signals traveling down a wire or cable from one location to another. Optical fibers are used in a variety of applications, such as local loops and "long haul" transmission lines. Long haul transmission lines might carry signals between cities or across oceans, for example. In other systems, the optical signal might propagate through space, rather than a fiber.

Optical fibers can carry a single channel, or many channels can be multiplexed onto a single fiber. Multiplexing is desirable because it allows more information to be carried on a single fiber. In WDM, a number of channels are carried on a single optical fiber. A channel is typically defined as a frequency (wavelength) of light that can be modulated to carry information. Networks are typically designed to allocate a portion of the spectrum about a center frequency for signal transmission. For example, a channel might be allocated ±12.5 GHz on either side of the channel center frequency in a particular system, thus providing the channel with a "width" of 25 GHz., even though the channels are spaced 100 GHz apart. Other systems may require or allow a narrower or wider channel widths or spacings.

In many optical transmission systems, provisions are made to amplify the signal (channels) at regular intervals. For example, amplification might be provided every 100 km along a long haul optical fiber path to account for signal loss (attenuation) as the optical signal propagates along the optical fiber. Many approaches have been developed to amplify the optical signals in an optical transmission system.

One early approach periodically converted the optical signal to an electronic signal, amplified the electronic signal, and re-generated the optical signal. This approach was cumbersome and required a relatively large number of components, making it prone to failure. It also typically required compromises in the amount of information (bandwidth) that could be amplified through a given path because the upper frequency limit of an electronic amplifier is generally much less than the available frequency bandwidth carried on an optical fiber.

Further approaches utilized light amplifiers to directly amplify the optical signal. There are many types of light amplifiers adaptable for use with optical communication networks; however, a common type is the doped optical fiber amplifier. In a doped optical fiber amplifier, an element(s), such as erbium (Er) is added to the composition of the glass that the fiber is made from. The dopant generally provides energy levels, or states, that can be occupied by photons in the glass fiber. The doped fiber is "pumped" with an external light source, such as a pump laser diode, and this pump light is used to amplify the optical signal.

Erbium-doped fiber amplifiers ("EDFA's") provide a gain bandwidth suitable for simultaneously amplifying a number of optical channels, and one approach to amplifying the light signal is to amplify all the channels at once in a single broad-band EDFA. This is desirable because it requires only a single amplifier and associated pump circuitry, but has disadvantages, too. First, the gain provided by an EDFA is not uniform for all frequencies (channels). This can result in unequal amplification of the channels, or even an optical signal(s) within a channel. Generally, the greater the bandwidth (i.e. number of channels) amplified by the amplifier, the greater the difference in gain. In a transmission system where amplification is repeated several times between the source and eventual receiver, the difference in signal level between channels could build to unacceptable levels, since the gain difference generally repeats at each amplifier stage.

One way to compensate for the uneven gain is with a GFF. A GFF is generally an optical filter with a transmission characteristic inversely complimentary to the gain response of the amplifier. In other words, the transmission loss through the filter is greatest at the wavelength that is most strongly amplified and is least (preferably essentially zero) at the wavelength having the least amplification.

Second, the gain provided to any one channel is typically somewhat dependant on the total signal the EDFA is amplifying. In other words, the total power needed by the amplifier increases with increasing channel count. For example, at a given pump power, if an EDFA initially amplifies four channels, and the signal traffic on the transmission fiber is expanded to eight channels, the gain of the four original channels will generally be higher than the gain of those channels when the amplifier carries the additional signal traffic. While the light amplifier can sometimes be pumped for higher gain to accommodate the increased number of channels, higher pumping often injects more noise, such as amplified spontaneous emissions ("ASE"), as well as requiring more power from the pump source, often accelerating failure.

One approach to avoid some of the problems associated with broadband amplification of the entire transmission spectrum has been to de-multiplex the transmission spectrum into a number of segments, and to route each segment through an amplifier path. After the segment of the transmission spectrum has been amplified, the optical signals can be sent to a multiplexer and coupled onto the output transmission fiber, or routed to an independent destination, such as a local metro loop.

WDM amplifier systems allow the use of amplifiers optimized for performance over a portion of the band, each amplifier operating more or less independently from the others. However, providing several amplifiers to cover the transmission spectrum increases the component count, and typically increases the volume required for the amplifiers and associated circuitry. Also, WDM filters are relatively expensive, and conventional designs typically employ two filters, one on the output and one on the input. These filters should be closely matched in frequency response to avoid unintended bandwidth narrowing arising from slightly offset center frequencies. The filters should also be matched for thermal drift, or temperature compensated, so that bandwidth narrowing does not arise from changes in the ambient temperature.

Accordingly, an optical amplifier providing matched WDM filtering is desirable. It is further desirable that such an amplifier provide matched thermal drift characteristics to avoid thermally induced bandwidth narrowing. It is further desirable that the amplifier provide integral gain compensation

SUMMARY

A four-fiber ferrule assembly is used in an optical amplifier. Doped amplifier fiber sections can be assembled directly into the ferrule(s), or spliced to pigtails. In one application, a four-fiber ferrule contains a pump input fiber for forward pumping one amplifier stage with a pump laser and a pump coupling fiber for forward pumping a second amplifier stage. Alternatively, the pump coupling fiber can be cleaved to provide a second forward pumping input from a second pump laser. The direction of propagation through each amplifier stage is the same, allowing an first optical isolator to be used on the input of both stages and a second optical isolator to be used on the output of both stages.

A single gain-flattening filter is placed in the optical path between the amplifier stages. The output of the second stage is also transmitted through the gain-flattening filter. Thus, a single gain-flattening filter can compensate gain variations in both stages. In a further embodiment, the optical path between amplifier stages includes center stage access for additional optical signal processing, such as dispersion compensation.

In another embodiment, a narrow bandpass filter is placed between the input to the first amplifier stage and a multi-channel optical fiber. The multi-channel optical fiber can also be held in a four-fiber ferrule. The narrow bandpass filter transmits a selected channel(s) to the amplifier input and reflects non-selected or "express" channels to an output fiber. The amplified selected channel is transmitted back through the narrow bandpass filter and can be coupled onto the output fiber to be re-combined with the express channels, or onto a second output fiber held in the four-fiber ferrule, depending on amplifier configuration.

A second input fiber can carry additional channels that are reflected off the narrow bandpass filter to the second output fiber to be combined with the amplified selected channel. In a further embodiment, an add channel fiber can transmit an add channel (generally occupying the same wavelength as the selected channel) through the narrow passband filter to be coupled with the express channels on the first output fiber.

DETAILED DESCRIPTION OF PREFERRED EMBODIMENTS

1. Introduction

The present invention provides an optical amplifier with a single WDM filter providing wavelength selection on both the input and output of the amplifier. In embodiments illustrated below, a doped fiber amplifier is discussed, but the amplifier could other sorts of optical amplifiers, such as semiconductor optical amplifier or a Raman optical amplifier. In a further embodiment, a two-stage amplifier is provided that uses a single GFF to compensate both stages. In general, the illustrated embodiments also provide optical amplifiers with a reduced number of isolators compared to convention amplifier designs, thus reducing component count, cost, and size. In some embodiments, a four-fiber ferrule optically coupled to a single collimator, such as a gradient-index ("GRIN") or ball lens. These assemblies are referred to herein as "quad collimators". In alternative embodiments, the ferrules could hold additional fibers, such as six or eight fibers, with some of the fibers not being connected, thus forming fiber stubs.

2. Quad Collimator Operation

Figure 1A:
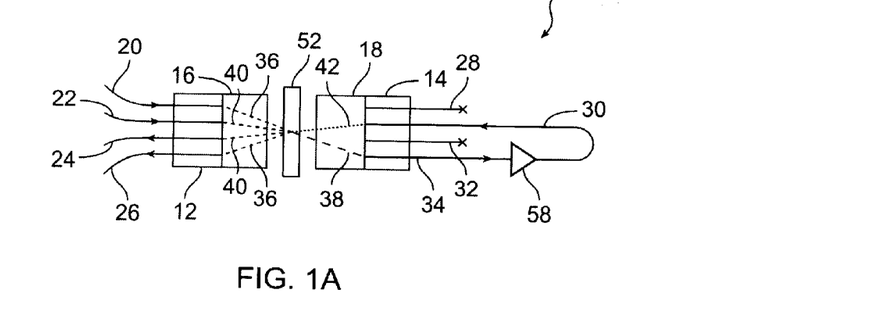
FIG. 1A is a simplified diagram of a dual quad collimator component according to an embodiment of the present invention.

FIG. 1A is a simplified representation of a dual quad collimator component 10 illustrating the optical beam path convention that is used to illustrate optical signal paths. The component has two four-fiber ferrules 12, 14 and two collimators 16, 18. Each four-fiber ferrule contains four optical fibers 20, 22, 24, 26 and 28, 30, 32, 34. The optical beam paths from the fibers on the left-hand side of the illustration couple to the fibers on the right-hand side of the illustration represented by the dashed and dotted lines 36, 38, 40, 42, as might occur if a wavelength-selective filter 52 were placed between the collimators to reflect some wavelengths and transmit others. Generally speaking, the coupling is reciprocal (absent an intervening optical isolator, for example), that is light can be coupled from one fiber to its compliment in either direction.

Additional optical elements, such as additional or other filters, mirrors, or isolators can be placed between the collimators but are not shown for simplicity of illustration. In the event that a mirror or other reflective element is placed at the end of a collimator, the convention used herein for illustration is that one "inner" fiber is reflectively coupled to the other inner fiber in the four-fiber ferrule, and one "outer" fiber is reflectively coupled to the other outer fiber. It is understood that "inner" and "outer" relate solely to the simplified representation of the assembly. In physical embodiments the four fibers are typically arranged about an axis essentially parallel to the long axis of the ferrule. In the event that less than four fibers are provided in a ferrule, similar optical beam path conventions apply.

Figure 1B:
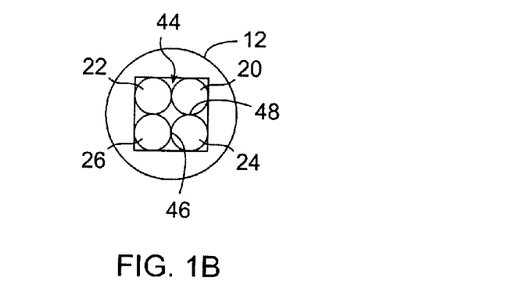
FIG. 1B is a simplified end view of a four-fiber ferrule with a square capillary according to an embodiment of the present invention.

FIG. 1B is a simplified end view of a four-fiber ferrule 12 showing the ends of the four fibers 20, 22, 24, 26. The fibers can be of the same type and diameter, such as all single-mode fiber, an example of which is SMF-28™ available from CORNING INC., of Corning, N.Y., or different types of fiber having the same diameter, such as SMF-28™ and doped amplifier fiber, or the fibers could be of different diameters. The ferrule is typically made of glass with a square or circular center capillary 44 just large enough to accommodate four evenly spaced fibers, assuming the fibers all have the same outer (cladding) diameter, for example about 125 microns. Different fibers with the same cladding diameter can have different core diameters. Many fibers come with an outer sheath of plastic material, which is typically stripped back before mounting the fiber end in the ferrule. The ferrules are generally cylindrical with a diameter of about 1.0 or 1.8 mm. The center of each fiber in that instance is therefore about 88.4 microns from the center of the ferrule for the 1.8 mm case.

The ferrule does not have to have a circular cross section, and could be square, rectangular or other shape, such as a circle with a flat cord. A circular shape is chosen in this instance for alignment purposes and mounting in a tubular housing. A square capilary keeps the fiber bundle from unduly twisting in the ferrule, which could complicate alignment. Other center opening shapes might be appropriate, such as diamond or trapezoidal if fibers of different diameters are assembled in the ferrule, which would also restrain the fiber bundle from twisting. In the case of a trapezoidal ferrule, it is generally desirable that the fiber centers are equidistant from the optical center of the GRIN lens to minimize insertion loss and cross-coupling.

It is preferable that each fiber touch the two adjoining fibers at contact points 46, 48 to aid in the alignment of the ferrule to the collimator. This can be achieved in a variety of fashions, such as tying the fibers together with string or elastic material, bundling the fibers with heat-shrink tubing, or using a tapered funnel-type fixture to hold the fibers in the desired relative aspect while cemented into the ferrule. In some instances, the fibers extend beyond the end of the ferrule that will face the collimator and are bundled together, with the excess length being cleaved off or otherwise removed. The end of the ferrule and fibers are typically lapped at an angle of about eight degrees to the center axis of the ferrule to reduce back reflections. In some instances an anti-reflective ("AR") coating is applied to the ends of the fibers, the face of the collimator, or both.

Figure 1C:
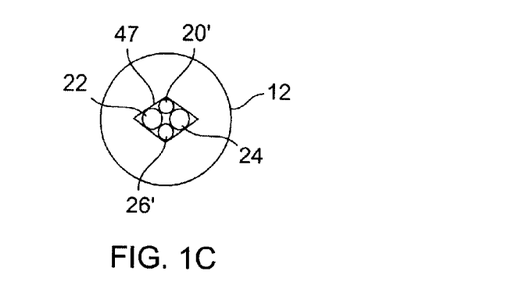
FIG. 1C is a simplified end view of a four-fiber ferrule with a diamond-shaped capillary according to another embodiment of the present invention.
Figure 1D:
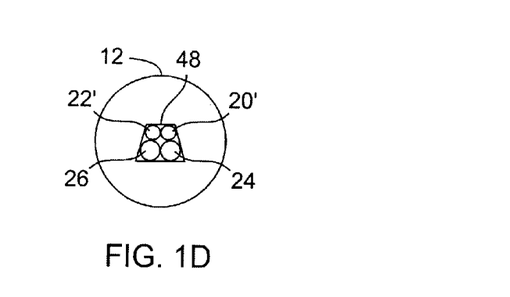
FIG. 1D is a simplified end view of a four-fiber ferrule with a trapezoidal capillary according to yet another embodiment of the present invention.
Figure 1E:
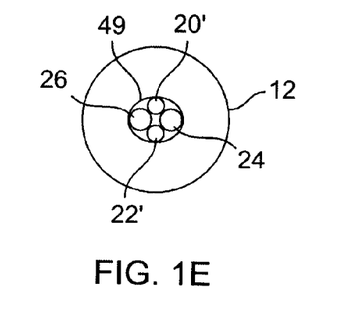
FIG. 1E is a simplified end view of a four-fiber ferrule with an oval capillary according to yet another embodiment of the present invention.

FIG. 1C is a simplified end view of a four-fiber ferrule with two optical fibers 22, 24 of a first diameter and two optical fibers 20', 26' of a second, smaller diameter arranged in a capillary 47 with a diamond-shaped cross section. FIG. 1D is a simplified end view of a four-fiber ferrule with two optical fibers 24, 26 of the first diameter and two optical fibers 20', 22' of the second diameter arranged in a capillary 48 with a trapezoidal cross section. FIG. 1E is a simplified end view of a four-fiber ferrule with two optical fibers 24, 26 of the first diameter and two optical fibers 20', 22' of the second diameter arranged in a capillary 49 with an oval cross section. Thus, the diamond, trapezoid, and oval capillaries mount fibers of differing diameters, and these cross sections in addition to the square cross section inhibit rotation of the fiber bundle.

3. Optical Amplifier with Single WDM Filter

Figure 2A:
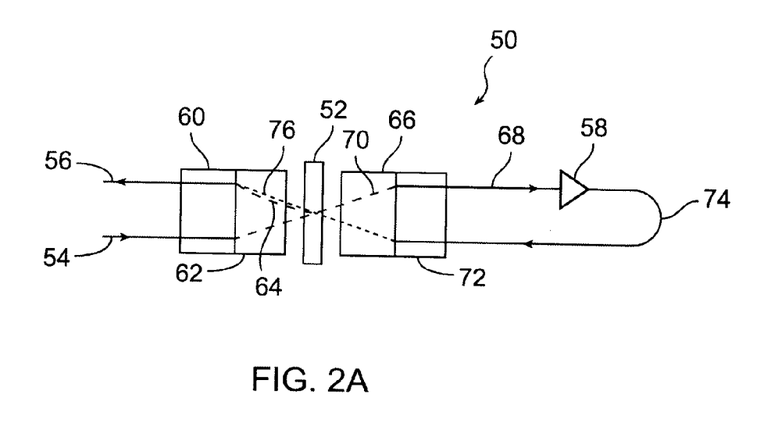
FIG. 2A is a simplified diagram of a wavelength-selective optical amplifier according to an embodiment of the present invention.

FIG. 2A is a simplified diagram of an optical amplifier assembly 50 using a single ADD/DROP filter 52 on both the input to and the output from the amplifier 58. The amplifier could be a doped-fiber amplifier or other type of optical amplifier. Additional details of the amplifier, such as pump coupling, are omitted for clarity of illustration. Similarly, the optical amplifier assembly could contain additional components, such as GFF or tap filters (partial mirrors). A ferrule 60 holds an input fiber 54 and an output fiber 56.

A first collimator 62 focuses the signals from the input fiber 54 on the ADD/DROP filter 52. An ADD/DROP filter is typically a narrow bandpass filter that transmits light at the selected wavelengths (the drop channel or channels), and reflects light at non-selected wavelengths (the express channels) from the input fiber 54 to the output fiber 56, as represented by the dashed line 64. In one embodiment, the ADD/DROP filter passes four contiguous channels spaced about 100 Ghz apart (center-to-center) at a nominal wavelength of about 1550 nm. The light beam transmitted through the ADD/DROP filter is focused by a second collimator 66 on an amplifier input fiber 68, as represented by the dashed line 70, held in a second ferrule 72, which provides the selected signal(s) to the optical amplifier 58. Two-fiber ferrules are illustrated, but four-fiber ferrules could be utilized with stub (unconnected) fibers inserted into the ferrules to simplify assembly and alignment.

The optical amplifier amplifies the selected signal and outputs the amplified optical signal on an amplifier output fiber 74. The amplified signal is then expanded by the second collimator 66 through the ADD/DROP filter 52 to the first collimator 62, which focuses the amplified signal beam onto the output fiber 56, as represented by the dotted line 76. The ADD/DROP filter can reflect unwanted signals on the amplifier output, such as optical pump signals and out-of-band noise.

Figure 2B:
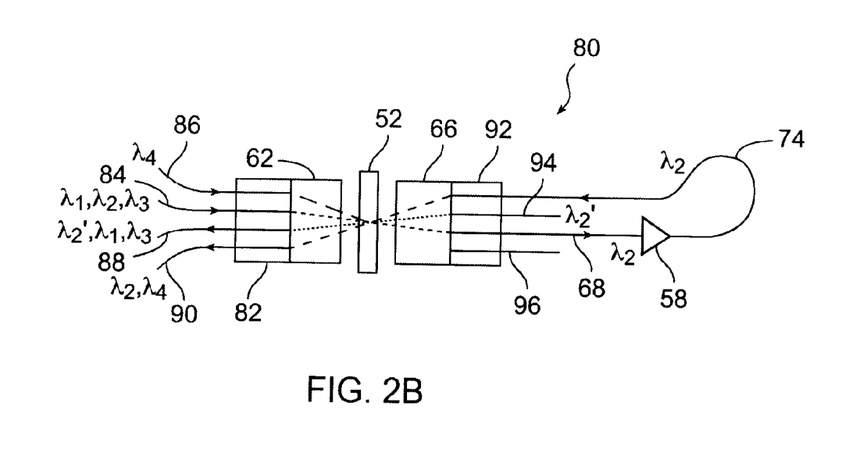
FIG. 2B is a simplified diagram of a wavelength-selective optical amplifier utilizing quad collimators according to another embodiment of the present invention.

FIG. 2B is a simplified diagram of an optical amplifier assembly 80 using a single ADD/DROP filter 52 on both the input to and the output from the amplifier 58 according to another embodiment of the present invention. A first four-fiber ferrule 82 holds a first input fiber 84, a second input fiber 86, a first output fiber 88, and a second output fiber 90. A second four-fiber ferrule 92 holds the amplifier input fiber 68 and the amplifier output fiber 74. Two stub fibers 94, 96 are used as place holders to aid in the alignment of the fibers. A two-fiber ferrule providing the desired optical alignment to the first collimator 62 could be used instead of the four-fiber ferrule and stub fibers.

As an example of operating as a wavelength-selective amplifier, the first input fiber 84 carries a plurality of optical channels $\lambda_1$, $\lambda_2$, $\lambda_3$. The ADD/DROP filter transmits a selected channel (or number of contiguous channels) $\lambda_2$ to the amplifier input fiber 68. The remaining channels $\lambda_1$, $\lambda_3$ are reflected to the first output fiber 88. The selected channel is amplified and routed from the amplifier output fiber 74 to the second output fiber 90.

Additional channels $\lambda_4$ can be provided on the second input fiber 86 and reflected off the ADD/DROP filter 52 to the second output fiber 90, to be carried with the amplified channel $\lambda_2$. Any signal, cross-talk, or noise energy on the second input fiber within the selected passband of the filter will be essentially transmitted through the filter to be terminated in the stub fiber 96. Hence, the selected channel has been dropped from the first input, amplified, and added to the second input signal(s).

Another signal $\lambda_2'$ at the selected wavelength can be added to the remaining (expressed) first input signals $\lambda_1$, $\lambda_3$ by providing the added channel $\lambda_2'$ on the fiber 94. The second input fiber 86 provides additional optical signals (channels) $\lambda_4$ (or $\lambda_1'$, $\lambda_3'$) that are reflected off of the ADD/DROP filter 52 to the second output fiber 90. Thus, the express channels from the first input can be routed independently with a new signal occupying the bandwidth previously occupied by the dropped channel.

Providing a single ADD/DROP filter eliminates the problem of bandwidth narrowing that can occur with multiple ADD/DROP filters, and also eliminates thermal tracking and differential aging drift between multiple filters, which can also contribute to bandwidth narrowing. Controlling bandwidth narrowing is desirable because it allows more of the allocated bandwidth between channels to be used in the design of the filters, rather than being necessary to set aside for potential bandwidth narrowing of the system. Conversely, it could allow closer spacing between channels assuming a constant filter characteristic.

Figure 2C:
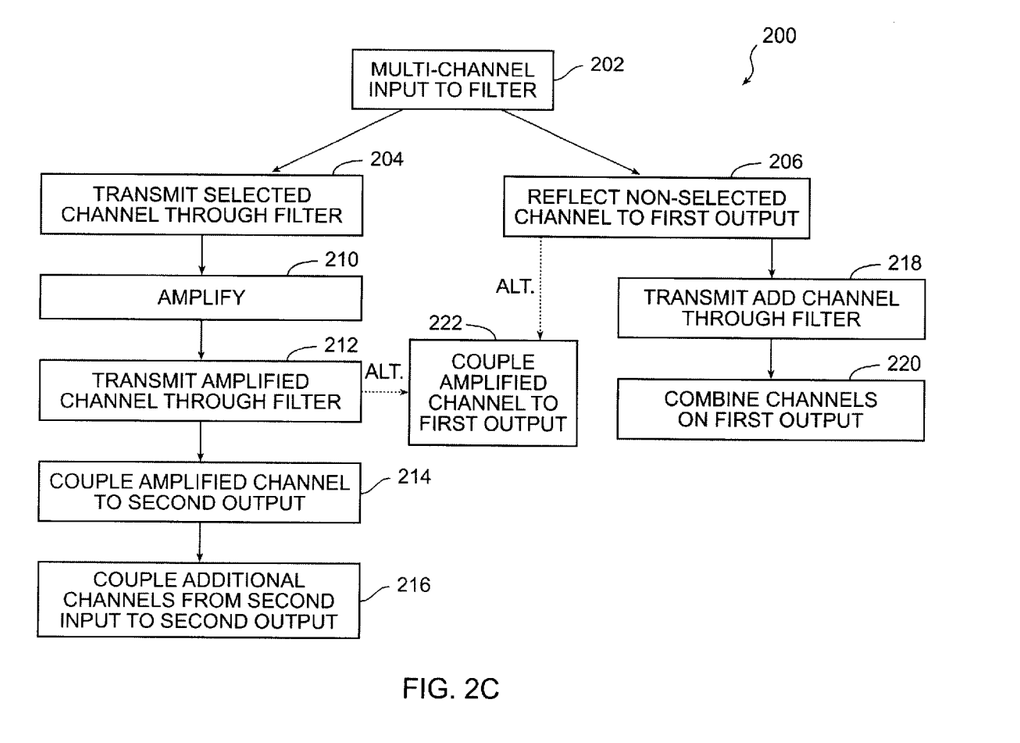
FIG. 2C is a simplified flow chart of a process for amplifying an optical signal according to an embodiment of the present invention.

FIG. 2C is a simplified flow chart of a process for routing signals in a wavelength-selective amplifier component 200. An input signal carrying a plurality of optical channels is provided to a wavelength-selective filter (step 202). A selected channel(s) is passed through the wavelength-selective filter (step 204) while the remaining channel(s) is reflected off the wavelength-selective filter to a first output (step 206). The selected channel is provided to the input of an optical amplifier and amplified (step 210). The amplified selected channel is then passed through the wavelength-selective filter (step 212) to a second output (step 214). Additional channels can be added (step 216) to the amplified signal on the second output by reflecting from a second input off the filter to the second output.

An add channel in the selected band can also be transmitted through the filter (step 218) to be combined (step 220) with the reflected channels from the first input on the first output. Alternatively, after transmitting the amplified channel through the filter (step 212), the amplified channel can be re-joined with the original channels on the first output (step 222).

4. Multi-Stage Optical Amplifier with Single GFF

Figure 3A:
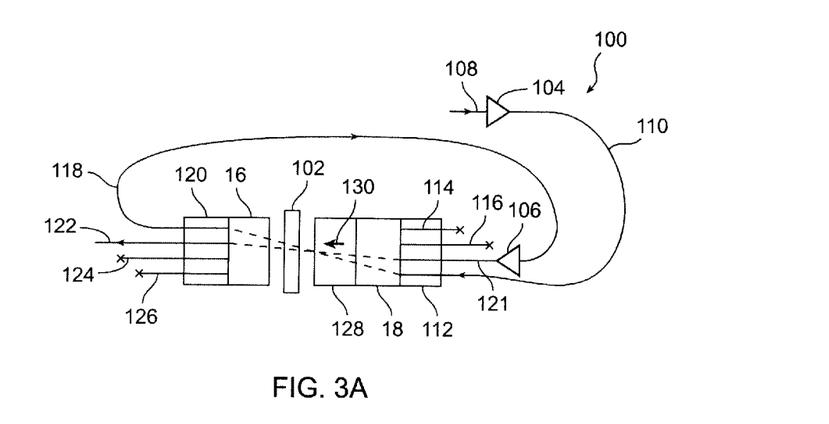
FIG. 3A is a simplified diagram of a dual-stage optical amplifier with a single gain-flattening filter according to an embodiment of the present invention.

FIG. 3A is a simplified diagram of a multi-stage optical amplifier assembly 100 utilizing a single GFF 102 to compensate for the gain versus wavelength characteristics of two amplifier stages 104, 106. The amplifier stages are generally nearly identical or only slightly different. For example, the gain an amplifier provides can be dependent on many factors, such as pump power, the wavelength of the pump signal, and power level of the input signal, among others, in addition to the nominal variation of gain versus wavelength. While desirable, it is not generally necessary to exactly compensate the gain variation of the amplifier stages, as long as the amplified signal is within specified limits, hence, the stage do not have to be identical or operate in an identical fashion.

An input signal on a first input fiber 108 is provided to the first amplifier stage 104, which outputs a first amplified signal on a first output fiber 110 held in a first ferrule 112. A four-fiber ferrule with stubs 114, 116 is illustrated, but a two-fiber ferrule could be used. The first amplified output is coupled through collimators 16, 18 through the GFF to a second input fiber 118 held in a second ferrule 120 and to provide a first gain flattened amplified signal to the second amplifier stage 106. The second amplifier stage amplifies the first gain flattened amplified signal to produce a second amplified signal on the second output fiber 121. This second amplified signal is also passed through the GFF to compensate for gain flatness a second time and output to an output fiber 122.

The stub fibers 114, 116, 124, 126 could be used for optical coupling purposes. For example one stub fiber 126 could be used to provide a forward pump signal to the second stage amplifier 106 reflected off the GFF or another filter (not shown). Alternatively, another stub fiber 114 could be used to provide a back pump signal, at the same or a different wavelength, for example, to the first stage amplifier 104. Similarly, a stub fiber (e.g. 116 or 114) could be used as a power tap to sample the output signal level from an amplifier stage (e.g. 106 or 114), which could be facilitated with a slightly reflective interface between the GFF and collimator, for example. Additional elements, such as filters to prevent the pump light from entering the input or output fibers, are not shown for clarity of illustration.

An isolator 128 allows the transmission of light in the direction indicated by the arrow 130 but not in the opposite direction. In this embodiment, a single isolator is used to isolate unwanted signals on the output 122 from entering the amplifier stages, as well as reducing unwanted signals, such as amplified secondary emissions ("ASE") noise generated in the second stage 106 from entering the first stage 104, where it might be further amplified. During assembly, a module containing the ferrules, collimators, GFF, and isolator can be fabricated with fiber pigtails that are subsequently spliced to optically couple to the amplifiers and each other.

Figure 3B:
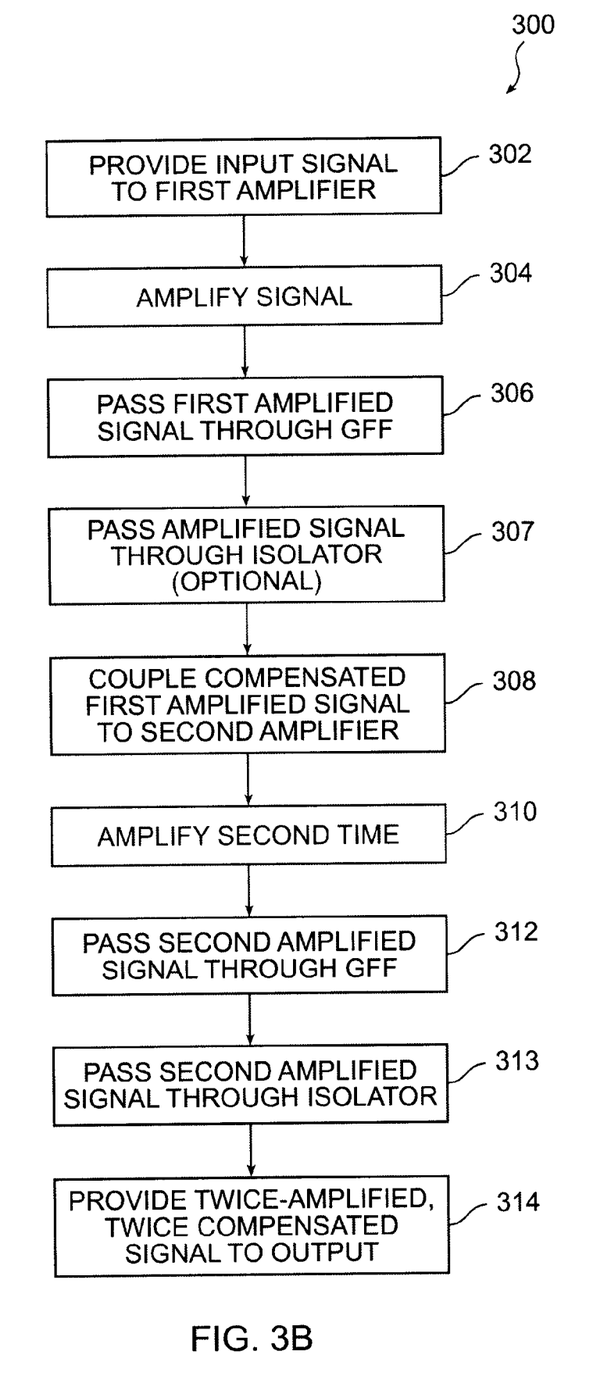
FIG. 3B is a simplified flow chart of a process for gain compensating a multi-stage optical amplifier according to an embodiment of the present invention.

FIG. 3B is a simplified flow chart of a process for compensating gain versus wavelength 300 in a multi-stage optical amplifier component. An input signal is provided to the input of the first stage of the amplifier (step 302) and amplified (step 304). The first amplified signal is routed through a GFF (step 306) to compensate gain variation a first time and provided to the input of the second stage of the amplifier (step 308), which further amplifies the signal (step 310). The second amplified signal is routed through the GFF (step 312) to compensate gain variation a second time before being provided to the output (step 314). In a further embodiment, the first amplified signal is also routed through an isolator (step 307) before being provided to the second stage, and the second signal is also routed through the isolator (step 313) before being output. Additional passes through the GFF are possible with six-fiber or eight-fiber ferrules, for example.

In some conventional multi-stage amplifiers a single GFF is used to overcompensate the signal, for example, if the filter is placed between the first and second stages, a single pass through the filter not only compensates for the first stage gain variation, but pre-compensates for the second stage gain variation. However, this approach reduces the signal to noise ratio for the overcompensated wavelengths, and may be undesirable in some applications.

5. Multi-Stage Amplifiers Utilizing Four-Fiber Collimators

Figure 4A:
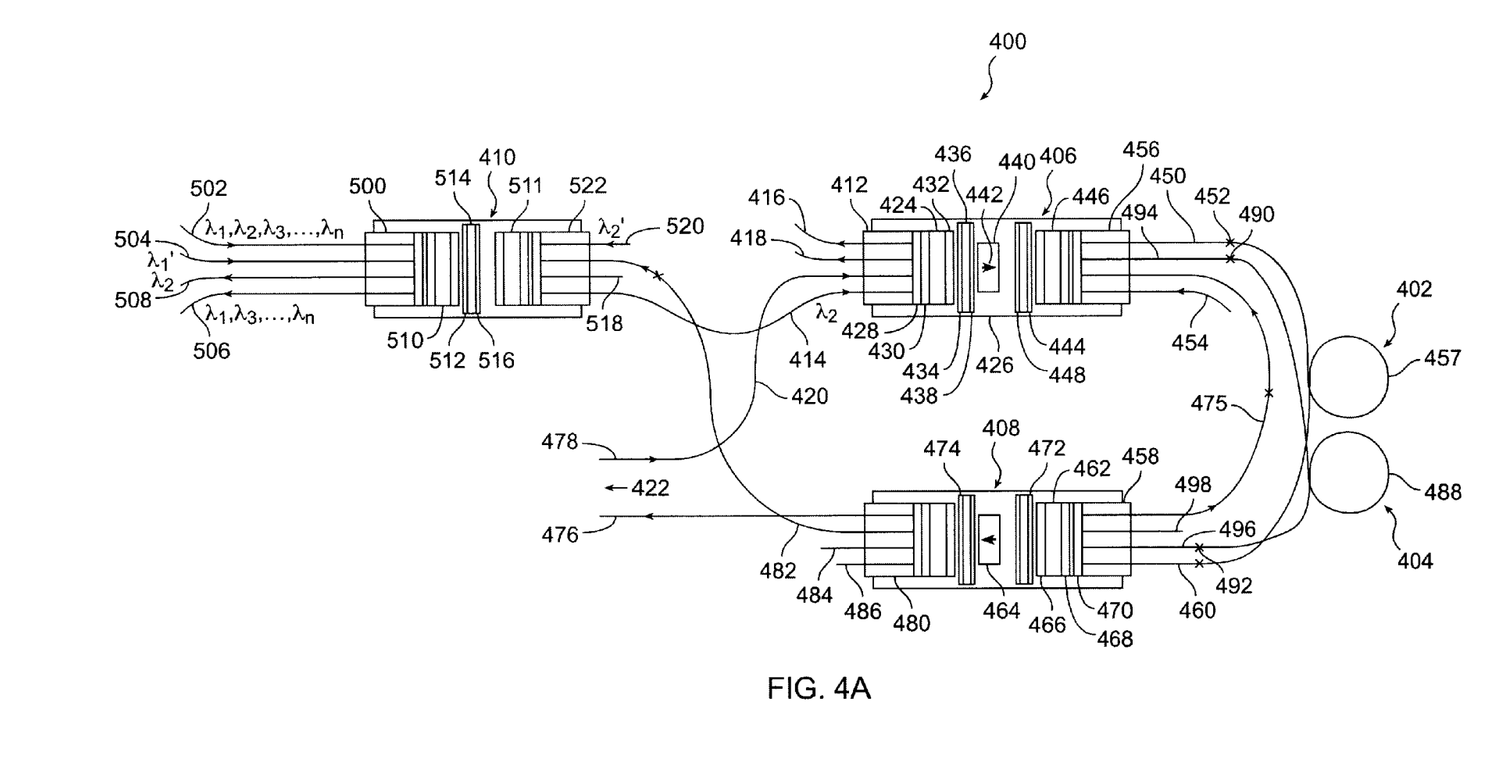
FIG. 4A is a simplified diagram of a two-stage wavelength-selective optical amplifier according to an embodiment of the present invention.

FIG. 4A is a simplified diagram of a two-stage optical amplifier 400 according to an embodiment of the present invention. A first doped-fiber amplifier stage 402 and a second doped-fiber amplifier stage 404 are coupled together through a first module 406 and a second module 408. A third module 410 can provide wavelength selection, as will be discussed in further detail below.

The first module 406 has a first four-fiber ferrule 412 holding an amplifier input fiber 414, a first stage input tap fiber 416, a second stage input tap fiber 418, and an inter-stage coupling fiber 420. A break 422 in the inter-stage coupling fiber is provided for center stage access ("CSA"). CSA can be used for dispersion compensation, additional filtering or sampling, or other functions where access to the optical signal is desired. Providing these functions between stages is desirable because the signal has been amplified once before the CSA and will be amplified again after the CSA, thus providing a strong signal at the CSA and the opportunity to compensate for signal loss through the CSA with the gain of the second stage.

A collimator 424, such as a GRIN lens or ball lens is held in a tubular housing 426 and is typically fixed in the housing in relation to the ferrule with epoxy or other adhesive. AR coatings 428, 430, 432 to reduce interface reflections at the wavelengths of interest. In one embodiment an AR coating is deposited directly on the angle-lapped face of the ferrule, and both ends of the collimator. The collimator may also be angle lapped to reduce back reflections (not illustrated). Similar anti-reflective coatings are shown on the other collimators and ferrules.

A tap filter 434 is formed on a glass substrate 436, which also has an anti-reflective coating 438 on the opposing face. The tap filter is a partial mirror at the signal wavelength, and reflects a small portion, typically about 2.5%, of the input signal from the input fiber 414 to the first input tap fiber 416. In embodiments where there is sufficient reflection back into the collimator to be focused on the tap fiber the tap filter can be omitted. The first tap signal can be used in a gain control loop to adjust the pump energy of the first amplifier stage 402 according to the input signal level.

An optical isolator 440 allows light to pass in the direction indicated by the arrow 442, but not in the reverse direction. Optical isolators and other components typically have AR coatings on both sides if there are air gaps between components. A low-pass filter 444 on a glass substrate 446 with an anti-reflective coating 448 is used to reflect the pump light, while transmitting the input signal to the first amplifier stage. The first amplifier stage is a doped-fiber optical amplifier, and in a particular embodiment is an erbium-doped fiber, although other types of dopants, including combinations of dopants, and even other types of amplifiers, could be used. In this embodiment a "pigtail" 450 of flexible optical fiber, such as FLEXCORE 1060™, available from CORNING, INC. of Corning, N.Y. is assembled into the second four-fiber ferrule 456 and joined to the erbium-doped fiber amplifier ("EDFA") section 457 with a splice 452. A forward pump signal is provided on a first pump fiber 454, and is reflected off of the low-pass pump-blocking filter 444 onto the first amplifier stage.

In one embodiment, the input signal is at nominally 1550 nm and the pump signal is at nominally 980 nm. Hence, the "low-pass" filter refers to lower frequency, not shorter wavelength. A tap filter or pump-blocking filter could be deposited directly on the collimator, rather than on a separate substrate. Other signal wavelengths and pump wavelengths, such as 1480 nm could be used, and it is not necessary that the pump-blocking filter be a low-pass filter, for example, the pump-blocking filter could be a bandpass or bandstop filter. Alternatively, a GFF that reflects the pump wavelengths could be used.

The other end of the first fiber amplifier stage 402 is coupled to a third four-fiber ferrule 458. Again, the first EDFA section 457 is spliced to a pigtail 460. Alternatively, one or both ends of the EDFA section could be held directly in a ferrule, thus omitting the pigtail(s) and splice(s). Each approach has advantages and disadvantages. Using pigtails and splices allows the first and second modules to be assembled and tested separately, and then joined by splicing. However, the convenience of this approach is somewhat offset by the additional splicing steps, which also introduces the potential for the splice failing as well as some additional transmission loss, especially if disparate types of fibers are spliced.

The first amplified signal is expanded by a third collimator 462 and transmitted through a second optical isolator 464. The AR coatings 466, 468, 470 on the third four-fiber ferrule and collimator are designed to reduce reflections at both the signal and the pump wavelengths. A second pump-blocking filter 472 reflects the pump light onto a pump coupling fiber 475. The pump coupling fiber is typically a flexible optical fiber and recycles the pump power from the first stage off the first pump-blocking filter 444, which reflects the recycled pump light to forward pump the second amplifier stage 404. The terms "forward" and "back" pump refer to the direction of propagation of the pump light down the fiber relative to the signal.

The first amplified signal passes through the second optical isolator 464 and a GFF 474. The GFF could be placed elsewhere in the second module 408, and could be deposited directly on one of the other elements or substrates, if desired. The GFF compensates for the wavelength-dependant gain variation of the first amplifier stage, and provides the compensated first amplified signal to the center stage input 476. Alternatively, the center stage input can be spliced to the center stage output 478, or a fiber can couple the compensated first amplified signal directly back to the first module 406. Center stage access is generally desirable for dispersion compensation or other signal processing. The center stage input fiber is held in a fourth four-fiber ferrule 480, along with the output fiber 482 and two fiber stubs 484, 486 used to hold the other fibers in place. In an alternative embodiment a two-fiber ferrule could be used with appropriate optical alignment.

After center stage processing, the signal is coupled back to the first module via the first four-fiber ferrule 412. The second tap fiber 418 can be used to monitor the strength of the compensated first amplified signal. This tap signal can be used to adjust the gain of the amplifier stages, typically by adjusting the pump drive level. As is known, altering the pump drive level on multi-stage EDFAs with recycled pump light not only changes the total gain of the system, but also the relative gain achieved in each stage. At this point the pump light has been stripped from the signal and has low ASE compared to other amplifiers that tap the signal before it has gone through a pump-blocking filter. The optical isolator 464 also helps to reduce ASE noise.

The signal again passes through the first optical isolator 440 to be focused onto the second amplifier stage 404. The second amplifier stage can be essentially the same as the first amplifier stage, i.e. the same type of doped fiber amplifier of about the same length, or different from the first amplifier stage. The second amplifier stage includes a second EDFA section 488 spliced 490, 492 to two pigtails 494, 496.

Pump energy from the first pump input 454 can be recycled to forward pump the second stage amplifier through the pump coupling fiber 475. A second pump input can be provided on the second pump fiber 498 to back pump the stages. This second pump input can be at the same or a different wavelength as the first pump input. In one embodiment, this second pump input can serve as a back-up pump input in the event that the first pump fails. In an alternative embodiment, the second pump fiber serves as a pump output port to measure the pump energy in the amplifier in order to monitor the pump signal. In yet another embodiment, the second pump fiber 498 could be the sole pump input, with the first pump fiber 454 serving as a pump output (monitor). In another embodiment, the pump coupling fiber 475 could be severed and a second forward and/or back pump laser coupled to either or each end of the pump coupling fiber.

The second amplifier stage 404 amplifies the signal and provides second amplified signal to the second module 408, where it is again stripped of the pump light by the second pump-blocking filter 472, passes again through the second isolator 464, and passes again through the GFF 474 before being coupled onto the amplifier output fiber 482.

Thus, only two isolators are needed for the two-stage amplifier, and provide the functionality of four isolators because each is used twice. Similarly, a single tap filter 434 provides both the input and inter-stage tap signals, and a single GFF 474 compensates the gain of both amplifier stages. Additional amplifier stages could be added with appropriate components, such as using six-fiber ferrules to build a three-stage amplifier that re-uses the GFF and isolators for each stage.

A third (optional) module 410 provides wavelength selection to the amplifier. This third module is referred to as an ADD/DROP module. A fifth four-fiber ferrule 500 holds a first input fiber 502, a second input fiber 504, a first output fiber 506 and a second output fiber 508. A fifth collimator 510 expands optical beams from or focuses optical beams onto the fiber ends. An ADD/DROP filter 512 is placed on the opposite side of the collimator from the ferrule. The filter is formed on a substrate 514 having an AR coating 516 on the opposite face.

This ADD/DROP filter is typically a bandpass filter that transmits light over a selected portion of the optical band and generally reflects light that is not within the selected wavelengths. These filters are often stacks of thin-film layers of optically transparent material having different, often alternating, indices of refraction. Such filters can provide low insertion loss in band and low reflection loss out of band, with a fairly ideal filter characteristics (steep sides, sharp corners, and flat transmission band vs. wavelength).

However, the steep wavelength response that makes these types, or other types, of filters desirable can cause bandpass narrowing if these filters are placed in series. For example, one filter typically does not have exactly the same center frequency or passband width as another. These variations occur as a result of wafer-to-wafer variations, as well as run-out across a wafer. When two such filters are placed in series (cascaded), the resulting passband is essentially the subset of the co-extensive passbands of the two filters, which is typically narrower than either filter. Similarly, two filters, even with identical initial passbands, can exhibit different thermal drift or aging drift. Drift can also narrow the passband. It is generally desirable to use as much of the spectrum as possible for signal transmission while using as little as possible to accommodate for filter skirts and drift. Thus, a tension arises between having to fabricate filters to very stringent requirements of center frequency, bandwidth, and drift, and providing sufficient separation between channels (filter passbands) to accommodate non-ideal filter performance.

The first input fiber 502 carries a number of optical channels $\lambda_1, \lambda_2, \lambda_3, \ldots, \lambda_n$. The channel $\lambda_2$ that is transmitted through the ADD/DROP filter 512 is the first amplifier input 414. A remainder of the light channels $\lambda_1, \lambda_3, \ldots, \lambda_n$ are reflected off of the ADD/DROP filter 512 to the first output fiber 506. The remaining signals could be provided to additional amplifiers with different passbands, for example, to amplify all of the channels, which can be later combined onto a fiber. Each "channel" can be a number of contiguous channels, such as an approximately 400 GHz portion of the optical spectrum containing four or eight optical communication channels, for example.

The second input fiber 504 can contain signals $\lambda_1'$ to be combined with the amplified channel $\lambda_2$ on the second output fiber 508. In the event that the second input fiber carries optical energy within the passband of the ADD/DROP filter 512, it is transmitted through the filter to be terminated on a fiber stub 518, which along with a second fiber stub 520 positions the amplifier input fiber 414 and the amplifier output fiber 482 in a sixth four-fiber ferrule 522. Alternatively, the fiber stub 518 could be used as an second stage output tap, as is described in further detail below with reference to FIG. 4B. The third module also contains collimators 510, 511 with AR coatings. In one configuration, the first output fiber 506 is coupled to the second input fiber 504, such as by splicing or using a single fiber segment. In that case, the second output fiber would carry the channels provided on the first input fiber as well as the amplified selected channel. In yet another embodiment, an ADD channel $\lambda_2'$ is provided on the fiber 520 to couple through the ADD/DROP filter 512 to the first output fiber 506, thus occupying the bandwidth formerly occupied by the selected channel $\lambda_2$.

The same physical filter is used on both the input to the amplifier and the output from the amplifier. This eliminates filter mismatch and differential thermal and aging drift. Absolute drift is still an issue, but the use of this single filter allows a wider manufacturing tolerance for a given channel spacing than conventional two-filter designs, as well as reducing the component count of the assembly. The use of a single GFF 474 also reduces the component count of the assembly compared to designs utilizing multiple GFFs.

Figure 4B:
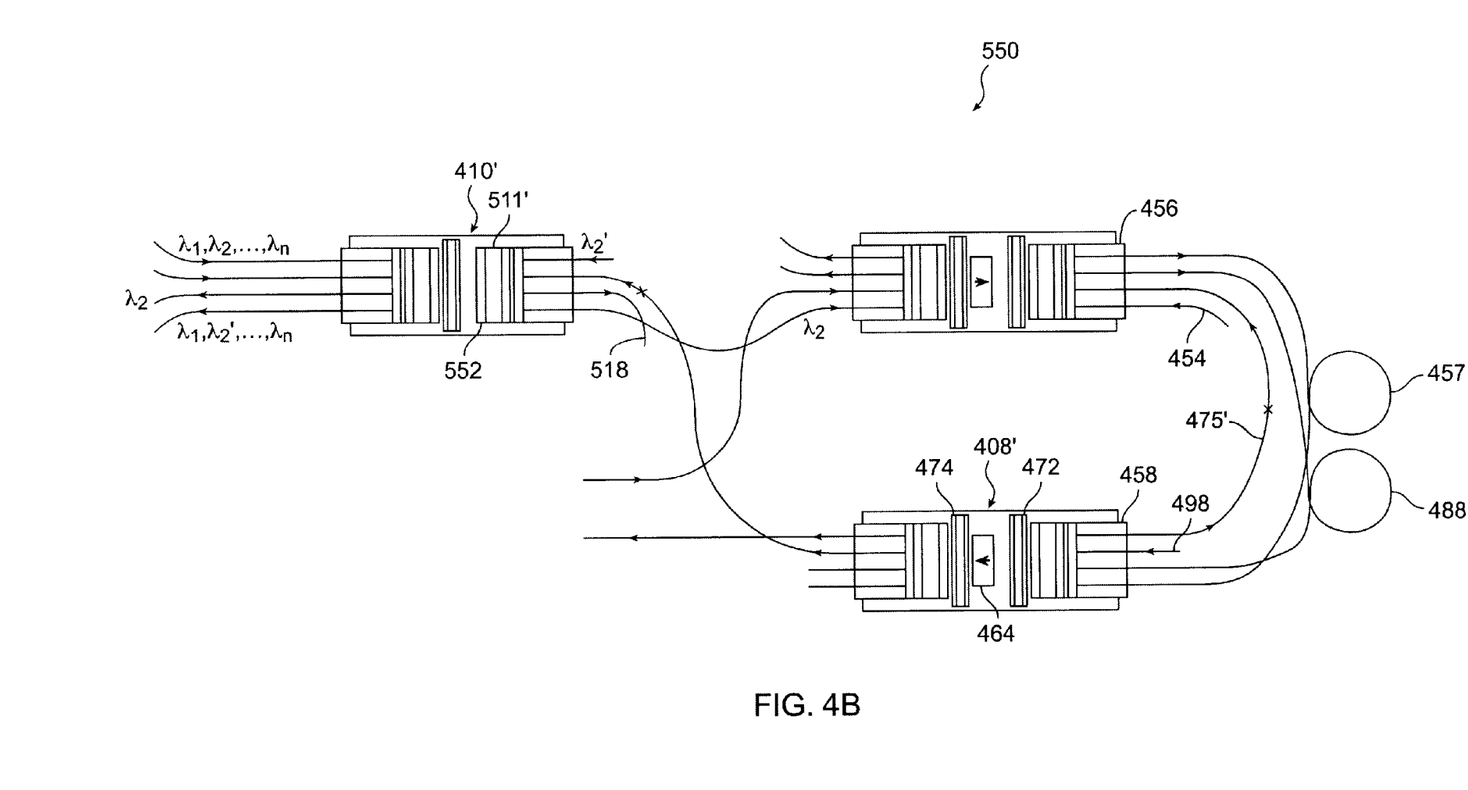
FIG. 4B is a simplified diagram of an alternative two-stage wavelength-selective optical amplifier according to another embodiment of the present invention.

FIG. 4B is a simplified diagram of a two-stage optical amplifier 550 according to another embodiment of the present invention. Illustrated features common to FIG. 4A and this figure are designated with the same reference numerals. A tap filter 552 has been formed on a face of the sixth collimator 511' in the third module 410' to provide a second stage tap output on the second stage tap output fiber 518. In one embodiment, this filter reflects about 0.5% of the signal, which minimally reduces the signal strength while providing an indication of the output signal strength. This tap signal has reduced ASE noise because it would come after the pump-blocking filter 472, isolator 464, and GFF filter 474 of the previous module 408'. Thus, this design allows separate monitoring of the input signal level, the first amplified signal level after CSA processing, if any, and of the output signal level. These measured values can be used to set the pump level to control the gain in the amplifier stages and/or to monitor system performance.

A forward pump signal at a first pump wavelength (e.g. 980 nm) is provided on the first pump input 454 and a back pump signal at a second pump wavelength (e.g. 1480 nm) is provided on a second pump input 498. Alternatively, the same wavelength could be used for each pump signal.

The first doped amplifier segment 457 is assembled into the second and third four-fiber ferrules 456, 458 without intervening pigtails. The pump coupling fiber 475' is also directly assembled in these ferrules. Thus, the second and third four-fiber ferrules both contain two distinct types of fibers, namely two Er-doped fibers and two non-Er-doped fibers, such as FLEXCORE 1060™ or SMF 28™ fibers.

Figure 4C:
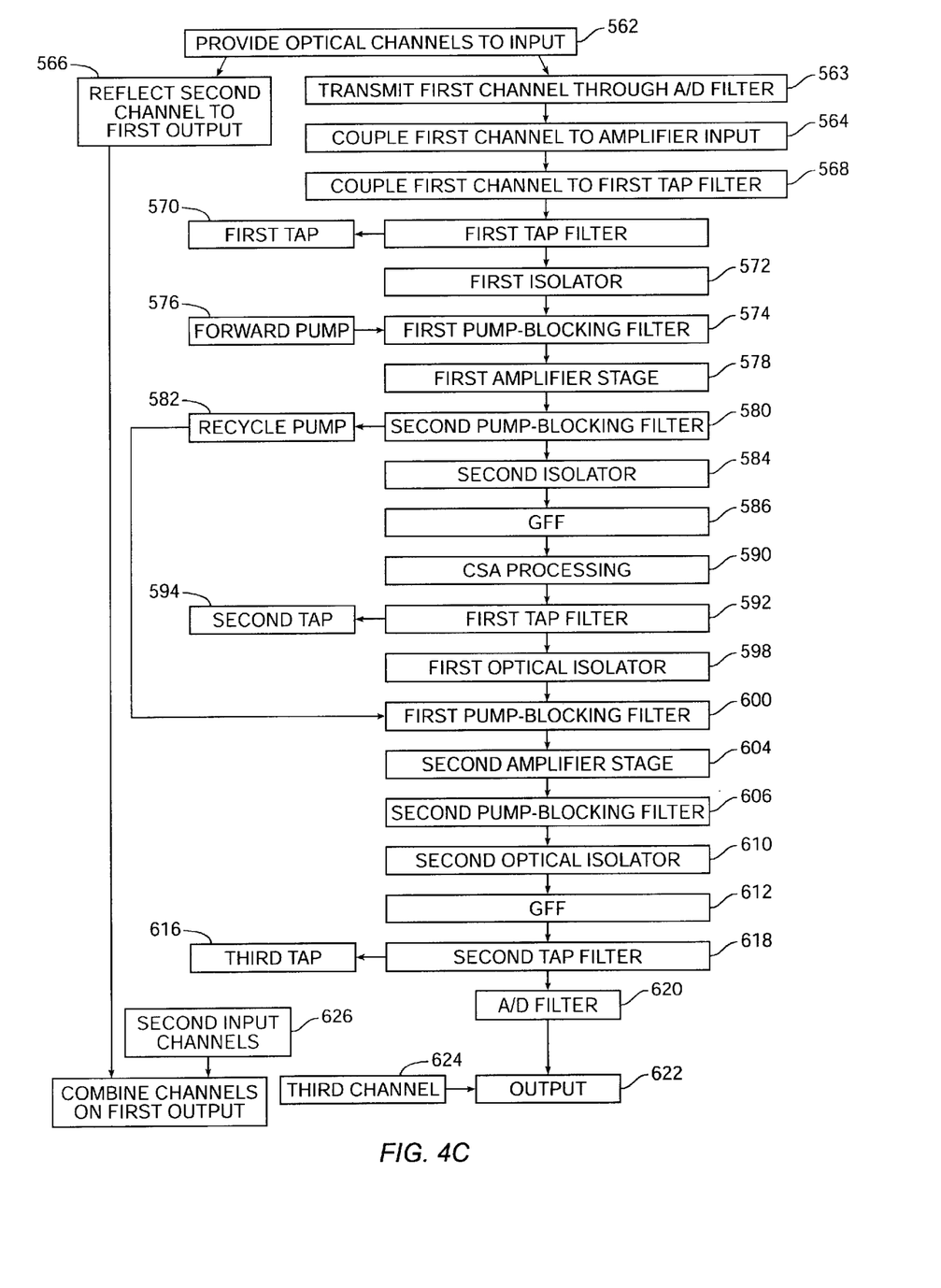
FIG. 4C is a simplified flow chart of a process for amplifying an optical signal in a two-stage optical amplifier according to an embodiment of the present invention.

FIG. 4C is a simplified flow chart of an optical signal amplification process 560 according to an embodiment of the present invention. At least two optical channels are provided on a first input fiber (step 562). A first channel is transmitted through a wavelength-selective filter (step 563) and coupled to a first amplifier input (step 564), while the second channel is reflected off the wavelength-selective filter to a first output fiber (step 566). The first channel is optically coupled to a first tap filter (step 568), which reflects a small amount of the input signal to a first tap fiber (step 570) and transmits the remainder of the input signal through a first optical isolator (step 572) and a first pump-blocking filter (step 574). A first pump signal is reflected off the first pump-blocking filter (step 576) to forward pump a first amplifier stage where the input signal is amplified (step 578). The first amplified signal is optically coupled to a second pump-blocking filter (step 580), which reflects recycled pump light to a pump coupling fiber (step 582) and transmits the first amplified signal. The first amplified signal is then passed through a second optical isolator (step 584) and a GFF (step 586), which at least partially compensates for wavelength-dependent gain in the first amplifier stage.

The compensated first amplified signal is optionally provided to a CSA input port, and processed (step 590), such as being dispersion compensated, to form a second amplifier input signal. The second amplifier input signal is optically coupled to the first tap filter (step 592), which reflects a small portion of the second amplifier input signal to a second tap fiber (step 594) and transmits the remainder of the second amplifier input signal through the first optical isolator (step 598) and the first pump-blocking filter (step 600) to a second amplifier stage. The recycled pump light from the pump recycling fiber is reflected off the first pump-blocking filter to forward pump the second stage amplifier, where the second amplifier input signal is amplified (step 604).

The second amplified signal is optically coupled to the second pump-blocking filter (step 606), which reflects the remaining pump light and transmits the second amplified signal (step 608) through the second optical isolator (step 610), and through the GFF (step 612), which at least partially compensates for wavelength-dependent gain in the second amplifier stage. The twice-compensated twice-amplified output signal is optically coupled (step 614) to a second tap filter, which reflects a small portion of the output signal to a third tap fiber (step 616), and transmits the output signal through the tap filter (step 618) and the wavelength-selective filter (step 620). The output signal is optically coupled to an output fiber (step 622).

In a further embodiment, a second input fiber carrying a third channel, which can occupy the same band as the first channel, is reflected off the wavelength-selective filter to the second output fiber (step 624). In another embodiment, the first output fiber is optically coupled to the second input fiber (step 626) to combine the first channel and the second amplified channel on the second output fiber. In yet another embodiment, the output signal is optically coupled through the wavelength-selective filter to the first output to be combined with the first channel on the first output fiber.

6. Exemplary Signal Levels

A typical two-stage amplifier and CSA may produce the following signal strengths. Assuming an input signal level ($\lambda 2$) of about −10 dBm, the insertion loss through the third module is about 1 dB, thus the input to the first amplifier input port is about −11 dBm. The insertion loss through the first module is about 1.5 dB, partly due to the isolator, thus the signal level at the first EDFA segment is about −12.5 dBm. The first Er-doped fiber segment amplifies the signal to about 6 dBm. The transmission loss through the second module is about 3 dB, due partly to the GFF and isolator, thus the output to the CSA is about 3 dBm. A typical dispersion compensation scheme might introduce about 11 dB of loss, thus the signal level provided to the first module is about −8 dBm. With another 1.5 dB loss through the first module, the second EDFA provides about 6 dBm on the output and thus 3 dBm at the output of the second module.

The gain through each stage can controlled by the length of the Er-doped fiber segment and pump drive level, among other factors. As is known, forward pumping an Er-doped fiber segment close-couples the pump light in the fiber, essentially attenuating the pump signal as it propagates down the fiber. The first stage therefore might exhibit considerably more gain than the second stage at a high pump level, but more equal gain at a lower pump level.

There is another 1 dB of loss through the third module, so the output signal level from the entire assembly, including CSA loss, is about 2 dBm. Thus, the assembly provides wavelength-selective optical amplification, including CSA correction, with about 12 dB of gain. The loss through any module can vary according to a number of factors, such as the alignment of one fiber end or another to its respective collimator. Accordingly, these values are merely exemplary.

7. Experimental Results

A concern arose that an optical amplifier utilizing four-fiber ferrules would be difficult to manufacture. In particular, one concern related to the difficulty of assembly, namely the need for highly skilled labor and/or expensive assembly tooling, another related to potentially unacceptably long assembly times, and another concern related to achieving suitably low insertion loss for all fibers in the ferrule. Stated another way, a concern was raised that only some, e.g. two, of the fibers in any given four-fiber ferrule could be aligned with sufficient accuracy to provide low insertion loss (less than about 0.25 dB), the remaining fibers having higher loss. If such were the case, the insertion loss of the input fiber would probably be optimized because that is typically the lowest signal level.

A preliminary experiment was performed using a mirror affixed (bonded) to the end of a collimator instead of an ADD/DROP filter to measure the insertion loss between fiber pairs in the four-fiber ferrule. A simple three-axis (x, y, z) alignment fixture was used to manipulate the ferrule assembly with respect to a fixed GRIN lens-mirror assembly. Fiber-to-fiber insertion losses of 0.16 dB and 0.17 dB were achieved for the first and second fiber pairs while in the alignment fixture. After removing the finished part from the fixture the fiber-to-fiber insertion losses were <0.2 dB. There is some measurement uncertainty arising in this experiment, and the latter value appears to be acceptably low. AR coatings were present on the GRIN lens and fiber-ferrule assembly.

It is believed that adding rotation and tilt adjustments to the alignment fixture can further improve the alignment of the four fibers. Thus, it appears that a four-fiber ferrule can be assembled with sufficiently low loss on all four fibers for optical amplifier applications. Furthermore, the assembly times were not unduly long, especially considering the preliminary fixturing and lack of experience of the assembler. The assembly times are particularly acceptable in light of the reduced number of modules required, and the reduced number of components needing to be manipulated.

A second experiment was performed with an unbonded mirror in place of an ADD/DROP filter to align four fibers in each of two ferrule-collimator assemblies. The two assemblies were placed in a five-axis stage that allowed rotation between the first and second assemblies. After calibrating the test set, the insertion loss from one fiber through both GRIN lenses to the complimentary fiber was 0.38 dB, 0.25 dB, 0.26 dB, and 0.25 dB. Alignment was by hand, and it is believed that feedback controlled motor-driven alignment will produce superior results.

Although the invention has been described above with reference to specific embodiments, alternatives and equivalents may become apparent to one skilled in the art that nevertheless fall within the scope of the invention. For example, the relative position of various filters and other components, such as the GFF and isolator, may be changed without departing from the invention. Similarly, components are generally shown with an intervening air gap, but could be integrated, or coupled together with index-matching material, or cemented together. Accordingly, the invention is to be interpreted according to the following claims.

What is claimed is:

1. A four-fiber ferrule assembly comprising:
   a ferrule (456) with a capillary formed through the ferrule;
   a first doped optical amplifier fiber (457) disposed within the capillary;
   a second doped optical amplifier fiber (488) disposed within the capillary;
   a third optical fiber (454) disposed within the capillary; and
   a fourth optical fiber (475') disposed within the capillary, wherein the first doped optical amplifier fiber and the second doped optical amplifier fiber have a first outer diameter and the third optical fiber and the fourth optical fiber have a second outer diameter, the first outer diameter being different than the second outer diameter.

2. A four-fiber ferrule assembly comprising:
   a ferrule (456) with a capillary formed through the ferrule;
   a first doped optical amplifier fiber (457) disposed within the capillary;
   a second doped optical amplifier fiber (488) disposed within the capillary;
   a third optical fiber (454) disposed within the capillary; and
   a fourth optical fiber (475') disposed within the capillary, wherein the first doped optical amplifier fiber, the second doped optical amplifier fiber, the third optical fiber and the fourth optical fiber each have an outer diameter, and wherein the first doped optical amplifier fiber has a first core diameter and the third optical fiber has a second core diameter, the first core diameter being different than the second core diameter.

3. An optical amplifier assembly (50) comprising:
   a first ferrule (60) holding therein
      an input optical fiber (54) and
      an output optical fiber (56);
   a second ferrule (72) holding therein
      an amplifier input fiber (68) and
      an amplifier output fiber (74);
   an optical amplifier (58) disposed between and optically coupled to the
   amplifier input fiber and the amplifier output fiber;
      a first collimator (62) disposed between the first ferrule and
      a wavelength-selective filter (52); and
      a second collimator (66) disposed between the wavelength-selective filter and the second ferrule.

4. An optical assembly comprising:
   a first ferrule assembly including
      a first input fiber (86),
      a second input fiber (84),
      a first output fiber (90), and
      a second output fiber (88);
   a second ferrule assembly including at least
      an amplifier input fiber (68) and
      an amplifier output fiber (74);
   a wavelength-selective filter (52) disposed between the first ferrule assembly and the second ferrule assembly, a first collimator (62) being disposed between the first ferrule assembly and the wavelength-selective filter and a second collimator (66) being disposed between the wavelength-selective filter and the second ferrule assembly, wherein a first channel carried on the first input fiber is transmitted through the wavelength-selective filter to optically couple to the amplifier input fiber and a second channel carried on the first input fiber is reflected off the wavelength-selective filter to optically couple to the first output fiber, and an amplified output signal on the amplifier output fiber is transmitted through the wavelength-selective filter to optically couple to the second output fiber.

5. The optical assembly of claim 4 further comprising an optical amplifier (58) disposed between and optically coupled to the amplifier input fiber and the amplifier output fiber.

6. The optical assembly of claim 4 wherein the second ferrule further includes an output tap fiber (96).

7. The optical assembly of claim 4 further comprising an output tap filter disposed between the second collimator and the wavelength-selective filter.

8. The optical assembly of claim 4 wherein the second ferrule further includes an add channel fiber (94).

9. A wavelength-selective optical amplifier comprising:
   a first ferrule assembly including
      a first input fiber,
      a second input fiber,
      a first output fiber, and
      a second output fiber;
   a second ferrule assembly including
      a first optical fiber,
      a second optical fiber,
      an amplifier input fiber, and
      an amplifier output fiber;
   an optical amplifier disposed between and optically coupled to the amplifier input fiber and the amplifier output fiber;

a wavelength-selective filter disposed between the first ferrule assembly and the second ferrule assembly, a first collimator being disposed between the first ferrule assembly and the wavelength-selective filter and a second collimator being disposed between the wavelength-selective filter and the second ferrule assembly, wherein a first channel carried on the first input fiber is transmitted through the wavelength-selective filter to optically couple to the amplifier input fiber and a second channel carried on the first input fiber is reflected off the wavelength-selective filter to optically couple to the first output fiber, and an amplified output signal on the amplifier output fiber is transmitted through the wavelength-selective filter to optically couple to the second output fiber.

10. A method for amplifying a selected optical channel on an optical input fiber carrying at least two optical channels, the method comprising:
   providing a first channel and a second channel to a wavelength-selective filter;
   transmitting the first channel through the wavelength-selective filter;
   reflecting the second channel off the wavelength-selective filter to a first optical output;
   amplifying the first channel to create an amplified first channel; and
   transmitting the amplified first channel through the wavelength-selective filter.

11. The method of claim 10 wherein the amplified first channel is coupled to a second optical output.

12. The method of claim 11 wherein a third channel is provided on a second optical input fiber, the third channel being reflected off of the wavelength-selective filter to the second optical output.

13. The method of claim 10 wherein the amplified first channel is coupled to the first optical output.

14. The method of claim 10 further comprising a step of transmitting a fourth channel through the wavelength-selective filter to optically couple to the first optical output.

15. A method for amplifying a selected optical channel on an optical input fiber carrying at least two optical channels, the method comprising:
   providing a first channel and a second channel to a wavelength-selective filter;
   transmitting the first channel through the wavelength-selective filter;
   reflecting the second channel off the wavelength-selective filter to a first optical output;
   amplifying the first channel to create an amplified first channel;
   transmitting the amplified first channel through the wavelength-selective filter to a second optical output;
   providing a third channel on a second optical input fiber; and
   reflecting the third channel off the wavelength-selective filter to the second optical output.

16. The method of claim 15 wherein the first channel has a nominal wavelength and the third channel has the nominal wavelength.

17. A two-stage optical amplifier comprising:
   a first amplifier (104) providing a first amplified signal on a first amplifier output fiber (110);
   a first ferrule (120) holding
      a first gain-compensated output fiber (118) and
      a second gain-compensated output fiber (122);
   a second amplifier (106) coupled to the first gain-compensated output fiber and providing a second amplified signal on a second amplifier output fiber (121);
   a second ferrule (112) holding
      the first amplifier output fiber and
      the second amplifier output fiber;
   a first collimator (16) disposed between the first ferrule and
   a gain-flattening filter (102); and
   a second collimator (18) disposed between the gain flattening filter and the second ferrule.

18. A method of gain flattening a two-stage optical amplifier, the method comprising:
   providing an optical input signal to a first optical amplifier;
   amplifying the optical input signal to produce a first amplified signal;
   transmitting the first amplified signal through a gain-flattening filter to produce a first compensated amplified signal;
   providing the first compensated amplified signal to a second optical amplifier;
   amplifying the first compensated amplified signal to produce a second amplified signal; and
   transmitting the first amplified signal through the gain-flattening filter to produce a second compensated amplified signal.

19. The method of claim 18 further comprising steps of:
   transmitting the first amplified signal through an optical isolator; and
   transmitting the second amplified signal through the optical isolator.

20. The method of claim 18 further comprising a step, between the transmitting the first amplified signal through the gain-flattening filter step and the providing the first compensated amplified signal to the second optical amplifier, of optically processing the first compensated amplified signal.

21. The method of claim 20 wherein the optically processing step comprises dispersion compensation.

22. A method of gain flattening a two-stage optical amplifier, the method comprising:
   transmitting an optical input signal through a gain-flattening filter to produce a pre-compensated input signal;
   providing the pre-compensated input signal to a first optical amplifier;
   amplifying the optical input signal to produce a first amplified signal;
   transmitting the first amplified signal through the gain-flattening filter to produce a compensated amplified signal;
   providing the compensated amplified signal to a second optical amplifier; and
   amplifying the first compensated amplified signal to produce a second amplified signal.

23. The method of claim 22 wherein the gain-flattening filter is a pump blocking filter and further comprising a step of reflecting a pump light signal off of the gain flattening filter into the first optical amplifier.

24. A method of gain flattening a two-stage optical amplifier, the method comprising:
   providing an optical input signal to a first optical amplifier;

amplifying the optical input signal to produce a first amplified signal;

transmitting the first amplified signal through an optical isolator;

transmitting the first amplified signal through a gain-flattening filter to produce a first compensated amplified signal;

providing the first compensated amplified signal to a second optical amplifier;

amplifying the first compensated amplified signal to produce a second amplified signal;

transmitting the second amplified signal through the optical isolator; and transmitting the first amplified signal through the gain-flattening filter to produce a second compensated amplified signal.

25. An assembly for use in a two-stage optical amplifier, the assembly comprising:
a first four-fiber ferrule containing therein
a first end of a first amplifier section optical fiber,
a first end of a second amplifier section optical fiber,
a first end of a pump coupling optical fiber, and
a first fiber; and
a second four-fiber ferrule containing therein
a second end of the first amplifier section optical fiber,
a second end of the second amplifier section optical fiber,
a second end of the pump coupling fiber, and
a second fiber.

26. The assembly of claim 25 wherein the first end of the first amplifier section optical fiber is a first doped amplifier fiber and the first end of the second amplifier section is a second doped amplifier fiber.

27. The assembly of claim 26 wherein the second end of the first amplifier section optical fiber is the first doped amplifier fiber and the second end of the second amplifier section optical fiber is the second doped amplifier fiber.

28. A two-stage optical amplifier comprising:
an optical input (414) configured to provide an optical input signal to
a first optical isolator (440);
a first pump-blocking filter (444) disposed between the first optical isolator and
a first optical amplifier stage (402);
a first pump input (454) configured to optically couple a first pump signal to the first optical amplifier stage to forward pump the first amplifier stage;
a first optical amplifier output (460) configured to couple a first amplified signal and a remaining portion of the first pump signal to
a second pump-blocking filter (468);
a second optical isolator (464) disposed between the second pump-blocking filter and
a gain-flattening filter (474), the first amplified signal being transmitted through the second pump-blocking filter, the second optical isolator, and the gain-flattening filter to produce a first compensated amplified signal and to optically couple the first compensated amplified signal to
an inter-stage coupling fiber configured to transmit the first compensated amplified signal through the first optical isolator and the first pump-blocking filter to
a second optical amplifier stage (404);
a second pump input configured to optically couple a second pump signal to the second optical amplifier stage;
a second optical amplifier output configured to couple a second amplified signal and a remaining portion of the second pump signal to the second pump-blocking filter, the second amplified signal being transmitted through the second pump-blocking filter, the second isolator, and the gain-flattening filter to
an optical output.

29. The two-stage optical amplifier of claim 28 wherein the second pump signal is provided on a second pump input configured to optically couple the second pump signal to forward pump the second optical amplifier stage.

30. The two-stage optical amplifier of claim 29 wherein the second pump signal comprises recycled pump power coupled from the second pump-blocking filter to the first pump-blocking filter with a pump coupling fiber (475).

31. The two-stage optical amplifier of claim 30 further comprising a third pump signal provided on a third pump input configured to back pump the second optical amplifier stage and to back pump the first optical amplifier stage through the pump coupling fiber.

32. The two-stage optical amplifier of claim 31 wherein the first pump signal has a nominal wavelength and the third pump signal has the nominal wavelength.

33. The two-stage optical amplifier of claim 32 wherein the nominal wavelength is 980 nm.

34. The two-stage optical amplifier of claim 33 wherein the nominal wavelength is 1480 nm.

35. The two-stage optical amplifier of claim 31 wherein the first pump signal has a first nominal wavelength and the second pump signal has a second nominal wavelength.

36. The two-stage optical amplifier of claim 35 wherein the first nominal wavelength is 980 nm and the second nominal wavelength is 1480 nm.

37. The two-stage optical amplifier of claim 28 wherein the second pump input is configured to reflect the second pump signal off the second pump-blocking filter to back pump the second optical amplifier stage.

38. The two-stage optical amplifier of claim 37 further comprising a fourth pump input configured to reflect a fourth pump signal off the second pump-blocking filter to back pump the first optical amplifier stage.

39. The two-stage optical amplifier of claim 28 further comprising a first tap filter (434) configured to reflect a portion of the optical input signal to a first tap fiber (416) and to reflect a portion of the first compensated amplified signal to a second tap fiber (418).

40. The two-stage optical amplifier of claim 28 further comprising center stage access disposed between an output of the inter-stage coupling fiber and an input of the inter-stage coupling fiber.

41. The two-stage optical amplifier of claim 28 further comprising:
a wavelength-selective filter (514) disposed between a multi-channel input fiber (502) and the optical input (414) wherein a selected channel on the multi-channel input fiber is transmitted through the wavelength-selective filter to the optical input and a non-selected channel is reflected off the wavelength-selective filter to a first express output (506).

42. The two-stage optical amplifier of claim 41 further comprising a second express output (508) wherein a second compensated amplified signal is transmitted from the optical output through the wavelength-selective filter to the second express output.

43. The two-stage optical amplifier of claim 42 further comprising a second optical input (504) configured to reflect a second non-selected channel off the wavelength-selective filter to the second express output.

44. The two-stage optical amplifier of claim 41 further comprising an add input (520) configured to transmit a second selected channel through the wavelength-selective filter to the first express output.

45. The two-stage optical amplifier of claim 41 further comprising a second tap filter (552) disposed between the optical output and the wavelength-selective filter, a portion of a second compensated amplified signal being reflected off the second tap filter to a third tap fiber (518).

46. A wavelength-selective two-stage optical amplifier comprising:

a first input fiber configured to carry at least a selected optical channel and a non-selected optical channel;

a second input fiber configured to carry at least a second non-selected optical channel;

a wavelength-selective filter disposed to reflect the non-selected optical channel to a first output fiber and to transmit the selected optical channel to an amplifier input fiber configured to transmit the selected optical channel through a first optical isolator (440) and a first pump-blocking filter (444) disposed between the first optical isolator and a first optical amplifier stage (402);

a first pump input (454) configured to optically couple a first pump signal to the first optical amplifier input to forward pump the first amplifier stage;

a first optical amplifier output configured to couple a first amplified signal and a remaining portion of the first pump signal to a second pump-blocking filter configured to reflect the remaining portion of the first pump signal to a pump coupling fiber;

a second optical isolator disposed between the second pump-blocking filter and a gain-flattening filter (474), the first amplified signal being transmitted through the second pump-blocking filter, the second optical isolator, and the gain-flattening filter to produce a first compensated amplified signal and to optically couple the fist compensated amplified signal to an inter-stage coupling fiber configured to transmit the first compensated amplified signal through the first optical isolator and the first pump-blocking filter to a second optical amplifier stage (404) wherein the pump coupling fiber is configured to reflect the remaining portion of the first pump signal off the first pump-blocking filter to forward pump the second optical amplifier stage;

a second optical amplifier output configured to couple a second amplified signal and a remaining portion of the second pump signal to the second pump-blocking filter, the second amplified signal being transmitted through the second pump-blocking filter, the second isolator, and the gain-flattening filter to an amplifier output fiber configured to transmit a second compensated amplified signal through the wavelength-selective filter.

47. A method for amplifying an optical channel carried on a multi-channel input fiber, the method comprising:

transmitting the optical channel through a wavelength-selective filter;

amplifying the optical channel in a first optical amplifier stage to produce a first amplified signal;

transmitting the first amplified signal through a gain-flattening filter to produce a first compensated amplified signal;

providing the first compensated amplified signal to a second optical amplifier;

amplifying the first compensated amplified signal to produce a second amplified signal;

transmitting the first amplified signal through the gain-flattening filter to produce a second compensated amplified signal; and transmitting the second compensated amplified signal through the wavelength-selective filter.

* * * * *